United States Patent Office 3,460,956
Patented Aug. 12, 1969

3,460,956
TITANATE PRODUCT AND METHOD OF
MAKING THE SAME
Joseph Dahle, 1319 Hamilton St.,
Allentown, Pa. 18102
No Drawing. Continuation-in-part of application Ser. No.
366,627, May 11, 1964. This application July 19, 1968,
Ser. No. 745,988
Int. Cl. C09c 1/36; C01g 23/04
U.S. Cl. 106—287                                    26 Claims

ABSTRACT OF THE DISCLOSURE

An alcoholic solution of an organo-soluble titanate complex is prepared by reacting a tetraalkyl titanate with more than 1.5 mols of water in the presence of up to 2 mols of lactic acid or 0.5–15 moles nitric acid in a lower alkanol in which the reactants and reaction product are soluble. The resulting solution may be used to produce hard transparent surface coatings and pigments of $TiO_2$ after heat curing.

CROSS REFERENCE TO RELATED APPLICATIONS

This application is a continuation-in-part of my copending application Ser. No. 366,627 filed May 11, 1964, now abandoned.

BACKGROUND OF THE INVENTION

Tetraalkyl titanates have been used as coating materials which are converted to titanium dioxide in situ by heat. The conversion causes a drastic reduction in specific volume, and it is, therefore, difficult or impossible to produce adherent titanium dioxide coatings of substantial thickness in a single treatment using monomeric tetraalkyl titanates. In addition, the titanates are extremely hygroscopic and present serious processing problems as well as aging characteristics on storage. It has been proposed to partially hydrolyze the tetraalkyl titanates prior to their application as coating materials. However, removal of the alkyl radicals reduces the solubility of the tetraalkyl titanates in organic solvents commonly employed in the finishing industry. For example, the reaction product of one mol of tetraalkyl titanate with more than 1.5 mols water is no longer soluble in such solvents as lower alkanols. Even when a molar ratio of more than 1.25 is used the resulting coatings are chalky and rough, and lack the desirable transparency even before final curing at elevated temperatures. When an attempt is made to transform such defective coatings to titanium dioxide by heating, a fragmented, discontinuous deposit is obtained. The titanium bearing coating particles are not fully bonded to each other and to the substrate. These solutions are excessively hygroscopic and lack the necessary storage stability.

The solubility of the reaction products of water and tetraalkyl titanates obtained by conventional methods thus limits the displacement of alkyl radicals from the titanate that may be accomplished to secure desirable end products.

Titanium dioxide coatings or pigments prepared from alkyl titanates may be colored and otherwise modified by admixture with metal salts or esters whose ions and oxides are colored. The inorganic modifying agents are not readily soluble in anhydrous organic solvents, and they cannot, in the form of aqueous solutions, be admixed with conventional partially hydrolyzed tetraalkyl titanate coating compositions in order to impart color and other properties to the ultimate coatings or pigments. Instead expensive organic compounds with such metals must be used which usually are not available in the market place but have to be prepared specially at high cost.

SUMMARY OF THE INVENTION

This invention relates to the preparation of a homogeneous alcoholic solution of an organo soluble titanate complex containing titanium in the form of a hydrolyzation product of a tetraalkyl titanate. Solutions of these complexes may be used to produce hard coatings or pigments of high reflectance after heat curing.

DESCRIPTION OF THE PREFERRED EMBODIMENTS

This invention relates to novel titanium bearing coating materials and pigments, and more particularly to materials containing titanium in the form of highly hydrolyzed and polymerized alkyl titanates, from which hard coatings and pigments of high reflectance can be produced. Coating materials containing the hydrolyzed and polymerized titanates may be converted by heat to produce uniform adherent surface coatings of titanium dioxide.

I have found that tetraalkyl titanates, without losing their solubility in organic liquid media, may be combined with more water than would theoretically be required to replace all four alkyl radicals in a medium containing controlled amounts of lactic acid or nitric acid and in the presence of an organic solvent which is compatible with the tetraalkyl titanate, the water, the lactic acid, or nitric acid, and the hydrolysis product formed. The manner in which the acids influence the reaction between water and the tetraalkyl titanate is not known. However, when the clear, water insoluble, homogeneous coating solutions of the invention are applied to a surface, and the organic solvent is evaporated at ambient or moderate temperatures, transparent coatings are obtained. The coatings may be leached with water without loss of titanium. Since titanium lactate and titanium nitrate are water soluble, they cannot be present in the coatings, and presumably are not present in the coating solution prior to coating.

The exact nature of the products resulting from the interaction of water and tetraalkyl titanates, also referred to as alkyl orthotitanates, is not known. When reacted with a sufficient amount of water under suitable conditions, the alkyl titanates may be completely hydrolyzed to form polymeric hydrated derivatives of titanium dioxide.

Orthotitanates having alkyl radicals with one to eight carbon atoms have been found to be operative in the method of my invention. I prefer to use alkyltitanates containing from one to four, especially three to four, carbon atoms in their alkyl radicals, e.g. dimethyl-dibutyl, and di-isopropyldibutyl titanates. The tetraethyl and tetraisopropyl esters are hygroscopic liquids that fume in air and are somewhat difficult to handle.

The rate of hydrolysis of alkyl titanates decreases with increasing length of the carbon chain in the alkyl radicals. For example, the rate of hydrolysis of tetraoctyl titanates is so low as to make their use uneconomical under ordinary processing conditions. Likewise, the amount of $TiO_2$ obtainable from an organo titanate decreases with increasing weight of the alkyl radicals, increasing the cost of the coatings and pigments. Also, the shrinkage rate of a coating produced from partly hydrolyzed tetraalkyl titanates upon thermal curing inherently increases with the length of the carbon chain in the alkyl radicals making the use of higher-alkyl titanates less attractive.

The orthotitanic acid ester having the combination of chemical stability under ambient conditions, lowest inherent shrinkage rate, and adequate rate of hydrolysis which is most favorable for the applications of this invention now under consideration, is di-iso-propyl-di-n- butyl titanate. The higher hydrolyzation rate of the isopropyl radicals in the mixed ester favors the formation of linear polymers by condensation of the hydrolyzed esters. It is known from organic polymer technology that linear polymers of high molecular weight show better properties than branched polymers of lower molecular weight in areas such as tensile strength, density, etc., one reason being that the linear polymers are more readily oriented into compact crystal lattices. Similar properties are shown by the $TiO_2$ minerals anatase and rutile. The dimethyl-dibutyl titanate and similar mixed esters seem to possess these same advantages. The di-isopropyl-dibutyl ester is readily prepared from commercially available raw materials. It is, therefore, preferred in carrying out my invention, but it will be understood that the invention is not limited to any specific tetra-(lower) alkyl titanate.

In preparing a coating solution by hydrolysis of a tetraalkyl titanate, I prefer to use a solvent which is a common solvent for the tetraalkyl titanate, for the lactic or nitric acid, for the water of hydration, and for the hydrolysis product, so that the reaction takes place in a homogeneous system in which the reactants and reaction product are in solution. Suitable solvents are, for example, the lower alkanols containing up to six carbon atoms. Alkanols having three to four carbon atoms such as butanol and isopropanol are especially preferred. The alkanols can be used as solvents alone or in admixture or with auxiliary solvents or diluents so long as the alkanol predominates in the solvent system.

The alkanols should be used in an amount of at least three to four mols of alcohol per mol of alkyl titanate—preferably in a ratio of at least about 10 mols of alcohol per mol of titanate. There appears to be no critical upper limit.

The temperature at which the tetraalkyl titanate is reacted with water in the presence of lactic or nitric acid and solvent is not critical. The reaction starts and proceeds at room temperature, however, the speed of the reaction does increase upon heating. In the absence of important benefits that may be derived from heating, it is convenient to operate at ambient temperature, that is at the temperature naturally assumed by the reactants under prevailing conditions.

The amounts of lactic acid or nitric acid employed for stabilizing the solution of partly hydrolyzed titanate vary with the amount of water present. As little as 0.2 mol of lactic acid prevent formation of an insoluble reaction product from one mol tetraalkyl titanate and two mols water over a period of more than a week under ambient conditions in a liquid medium of enough alcohol to dissolve the original reactants. Two mols of lactic acid prevent turbidity in the presence of as much as 4 mols of water over a period of fifty hours. The presence of inorganic modifying agents may further affect the requirements for stabilizing acid. For best results under a wide variety of coating conditions, the mol ratio of lactic acid to titanium should be less than 2, and the mol ratio of water to alkyl titanate between about 3:1 and 1.5:1. It is desirable to keep the ratio of lactic acid to titanate as low as practicable. The preferred molar ratio of lactic acid to titanate lies in the range of 0.25–0.75 for optimum uniformity of coating and minimum cost. The higher lactic acid ratios, those ranging from 1 to 2, are advantageous in the manufacture of pigments of the general composition Ti—O—X—O—Y—O, where X and Y stand for other inorganic components and metals having a valence of 2.

With nitric acid, 0.5 to 15 mols thereof per mol of titanium are preferred, and molar ratios of water to titanium as high as 30:1 are readily possible with adequate amounts of nitric acid.

Because of the low shrinkage of the primary coatings of the invention during curing at elevated temperatures, adherent and/or coherent coatings of relatively great thickness can be prepared from the coating solutions of the invention in a single application. Heavier coatings can be built up by relatively few successive applications of coating solution.

It is known to produce pigments having plate-like particles by curing titanium bearing coatings to titanium dioxide under conditions which promote crazing and loss of adhesion. Such plate-like particles have an excessive thickness of more than one micron and have a yellowish tint making them unsuitable for use as pearlescent pigments. The coating solutions of my invention are eminently suitable for the manufacture of pigments including the pearlescent pigments by this basically known method. Pigment production is simplified by the insensitivity of the coating solutions of my invention to ambient moisture, by the relatively free choice of process conditions, and by the possibility of coloring the pigments ultimately formed by water soluble modifying and coloring agents added to the coating solution in aqueous carriers.

The following examples are further illustrative of the invention, and it will be understood that the invention is not limited thereto.

Example 1

2,272 grams tetraisopropyltitanate (8 mols) and 1,200 grams n-butanol (16 mols) were mixed thoroughly at room temperature. An exothermic reaction set in and raised the temperature of the mixture to 55° C. It was left standing for several days at ambient temperature, and 1,270 ml. of a low-boiling liquid, mainly consisting of isopropanol, were thereafter distilled off.

The residue consisted of material non-volatile at 100° C. It was clear, yellowish, slightly viscous liquid weighing 2,455 grams, and consisting essentially of di-i-propyl-di-n-butyl titanate.

Eight solutions were made up to contain 19.5% di-i-propyl-di-n-butyl titanate, enough water to give molar $H_2O:Ti$ ratios varying between 1:4 and 2:1, the balance of each solution consisting of an equimolecular mixture of isopropanol (99%) and n-butanol. The titanate and water were first combined with responsive portions of the alcohol diluent, and the premixed solutions were quickly stirred together. All mixtures were clear when initially prepared. They were inspected again 10 minutes, 20 minutes, 22 hours, and 96 hours later, and the first appearance of cloudiness was noted.

TABLE 1

| Solution No. | Ratio $H_2O:Ti$ | First cloudiness |
| --- | --- | --- |
| 1 | 0.25 | |
| 2 | 0.50 | |
| 3 | 0.75 | |
| 4 | 1.00 | |
| 5 | 1.25 | |
| 6 | 1.50 | 96 hrs. |
| 7 | 1.75 | 20 min. |
| 8 | 2.00 | 10 min. |

In the presence of more than 1.5 mols water per mol titanium, the di-i-propyl-di-n-butyl-titanate quickly forms a compound insoluble in the solvent system. Similar results were obtained with tetra isopropyl-, tetrabutyl-, titanates, and with other lower alcohols as solvents. The limit of stability of the solutions obtained was in all instances at or below 1.5 mols water.

Nine solutions were prepared from 19.5% di-iso-propyl-di-n-butyl titanate, varying amounts of water to give $H_2O:Ti$ ratios between 2:1 and 4:1, and varying amounts of lactic acid for lactic acid to titanium ratios of 1:4 to 2:1 on a molar basis, the remainder of each solution consisting of the aforementioned equimolecular mixture of isopropanol and butanol. In each instance, the water and lactic acid were combined with a portion of the solvents, the alkyl titanate with the remaining solvent, and the two pre-mixed solutions were then vigorously stirred together until a clear solution was obtained (a few minutes). The solutions were again inspected after 30 minutes, and after 3, 6, 20, 50, and 200 hours. The first appearance of a turbidity or cloudiness was noted.

TABLE 2

| Solution No. | Ratio $H_2O$:Ti | Ratio lactic acid: Ti | First cloudiness, hrs. |
|---|---|---|---|
| 9 | 2.0 | 1.0 | |
| 10 | 2.0 | 0.5 | |
| 11 | 2.0 | 0.25 | |
| 12 | 2.5 | 1.0 | 200 |
| 13 | 2.5 | 0.5 | 20 |
| 14 | 3.0 | 1.0 | 6 |
| 15 | 3.5 | 1.0 | 3 |
| 16 | 4.0 | 1.0 | |
| 17 | 4.0 | 2.0 | 50 |

These results could be duplicated when the di-isopropyl-dibutyl titanate was replaced by the other aforementioned alkyl titanates, and when the diluent of isopropanol and butanol was replaced by other alcohols as mentioned hereinabove.

In the presence of as little as 0.25 mol lactic acid, the stability of an alkyl titanate solution containing 2.0 mols water per mol titanium is increased from 10 minutes to about 200 hours when lower alkanols are used as the solvent system. Two mols lactic acid prevent formation of turbidity in the presence of as much as four mols water for fifty hours.

Nine solutions were prepared from tetraisopropyl titanate, varying amounts of water to give $H_2O$:Ti molar ratios between 0.001:1 to 2:1, and varying amounts of lactic acid to provide lactic acid to titanium molar ratios of 0.5:1 to 1.5:1. Each solution contained acetone in varying molar concentrations as the solvent. The solutions were prepared by diluting the titanate with acetone and adding the lactic acid combined with water and acetone under high speed stirring, until incipient precipitation.

TABLE 3

| Solution | Ratio acetone: Ti | Ratio $H_2O$:Ti | Ratio lactic acid:Ti |
|---|---|---|---|
| 18 | 10.2 | .001 | 0 |
| 19 | 15.3 | .060 | .5 |
| 20 | 13.0 | .06 | .6 |
| 21 | 14.6 | .09 | .5 |
| 22 | 1.0 | .9 | 1.0 |
| 23 | 2.1 | 2.0 | 1.5 |
| 24 | 1.0 | .9 | 1.0 |
| 25 | 3.2 | .7 | .8 |
| 26 | 4.2 | .9 | 1.0 |

When acetone is used to replace the alcohol solvents shown in Table 1 and Table 2 the stability of the alkyl titanate solutions is sharply reduced. Addition of lactic acid improves the stability substantially although not as pronounced as when alkanols are used as the reaction vehicle.

Example 2

The solutions Nos. 1–17 prepared as described in Example 1 were aged for 24 hours, and carefully cleaned glass plates 1" x 3" (microscope slides were dipped in samples of each solution which had been diluted with the aforementioned equimolar mixture of isopropyl and butyl alcohol, reducing the titanium content to an equivalent of 2% $TiO_2$ by weight. Each plate was held in a vertical position to drain for 5 minutes to remove excess liquid. It was then exposed to ambient air for 30 minutes, whereby a major portion of the volatile solvents was evaporated, and finally cured 2 minutes at 500° C.

Slides dipped in the diluted solutions Nos. 1, 2, and 3 showed milky coatings. Those from solutions Nos. 4 and 5 were smooth, fully transparent, and had a higher reflectivity than the glass slides themselves. Solutions Nos. 6, 7, and 8 did not yield coherent coatings, but the slides were covered with a whitish chalky material.

Example 3

Glass strips six inches long were immersed to a depth of five inches in a sample of solution No. 11 that had been diluted to 2% $TiO_2$ (ash) content as described in Example 2. The liquid film was permitted to drain for five minutes whereupon it was air dried for 30 minutes, and oven dried for 5 minutes at 75°–80° C. to evaporate retained solvent.

The cycle of dipping, air-drying, and oven-drying was repeated four times, but the depth of immersion was reduced by one inch in each cycle so that a series of juxtaposed coatings of gradually increasing thickness was produced. The glass plate with the composite coating was cured at 500° C. for two minutes.

The portions of the coating resulting from a single immersion or from double immersion were smooth and lustrous. Triple immersion caused noticeable crazing of the film during curing, and cohesion of the film further deteriorated with increasing number of drippings. The heaviest portions of the coating were transformed by curing into loose flakes that showed pearlesence and interference colors.

A second set of glass strips was subjected to a similar sequence of five cycles, but each layer of coating was cured 2 minutes at 500° C. before the next immersion step. All parts of the coatings produced were smooth and glossy, but each portion showed a different color. The thinnest coating was colorless and fully transparent. With increasing thickness, the color changed in steps to light gold, green, blue, and deep purple in reflected light. The complementary colors were shown in transmitted light.

A glass vase was given several coating cycles in the diluted solution No. 11, each cycle consisting of immersion, air-drying, oven drying, and curing. The vase received a hard lustrous outer coating the color of which varied with the contours of the vase between green and purple, and was highly decorative.

A tumbler of ordinary molded soda-lime glass was given a single coating which did not alter the transparency or color of the glass, but gave it the characteristic high reflectance of cut crystal.

Example 4

Parts of an airplane canopy made of clear polymethyl methacrylate were carefully cleaned by washing in an aqueous detergent solution, followed by rinses in distilled water, in iso-propanol, and again in distilled water, and by wiping until dry. They were then dipped in the solution No. 11 diluted to 2% $TiO_2$ content, drained, air-dried 5 minutes, and oven dried 5 minutes at 65° C. They were thereafter soaked in distilled water to remove residual water soluble material (solvents), and air-drying and oven drying were repeated.

The treated pieces had significantly improved luster. The coated polymethyl methacrylate parts were substantially more resistant to scratching in a conventional pencil test than uncoated pieces. They were also superior to pieces prepared from solution No. 4 under otherwise comparable conditions. Corresponding results were obtained when juxtaposed coatings produced from solutions Nos. 4 and 11 were subjected to abrasion by an eraser as is conventional in comparison tests for organic coatings. The coated materials were distinctly more water-repellent than uncoated pieces of the plastic.

The same method was used successfully for coating samples of polytetrafluoroethylene and cast allyl plastics, and the higher curing temperature possible with these plastics resulted in even harder glossy coatings.

Example 5

A stainless steel sheet of Type 302 was dipped in a bath of solution No. 11 diluted to 2% $TiO_2$ content as described in Example 3. The liquid film was air-dried, oven dried for 5 minutes at 75°–80° C., and cured in air at 500° C. for five minutes. The cured coating showed excellent adhesion to the stainless steel base which acquired a bright blue color during curing. This color was not significantly altered by additional heated to 500° C. for two hours.

An uncoated piece of the same sheet turned brown when placed in the curing furnace without a coating, and further severe oxidation took place on continued heating.

Because of the great difference between the expansion coefficients of the titanium oxide coatings of the invention and the stainless steel base, adherent multiple coatings could not be produced, but even a single coating greatly improved the oxidation resistance of the metal at high temperature.

Multiple coatings were produced on aluminum foil in the manner described in Example 3, and the color and reflectance effects produced were similar to those on glass.

Example 6

The following solutions were prepared from di-isopropyl-di-n-butyl titanate, distilled water, 85% lactic acid, 99% isopropanol, n-butanol, and silver nitrate (mM.—millimol):

TABLE 4

| Solution No. | Di-isopropyl-dibutyl titanate, mM. | Water, mM. | Lactic acid (100%), mM. | i-Propanol, mM. | n-Butanol, mM. | AgNO₃, mM. |
| --- | --- | --- | --- | --- | --- | --- |
| 27 | 11.7 | 135 | 59 | 346 | 425 | |
| 28 | 11.7 | 164 | 63 | 431 | 425 | 2.5 |
| 29 | 11.7 | 194 | 67 | 568 | 425 | 5.0 |
| 30 | 11.7 | 224 | 71 | 680 | 425 | 7.5 |

Glass plates were dipped in each of the clear solutions, air-dried, and cured as described in Example 2. The coatings produced in each instance were smooth, highly reflectant, and fully adhered to the glass substrate. The coating produced from solution No. 27 was colorless, that from solution No. 30 has the characteristic deep purple color of colloidal dispersions of noble metals in glass, and lighter colors were shown by the plates dipped in solutions Nos. 28 and 29.

Substantially the same results were obtained when silver nitrate was replaced by equimolecular amounts of gold chloride. $AuCl_3 \cdot HCl \cdot 4 H_2O$.

Example 7

A partly polymerized butyl titanate was prepared by mixing 312 grams di-isopropyl-di-n-butyl titanate with 22.5 grams water and 880 grams butanol. The mixture was left to stand at room temperature, and it was then heated at ambient pressure to volatize the solvent present. Almost 1,200 ml. of a liquid mainly consisting of iso-propanol and butanol were recovered.

The viscous hot distillation residue was diluted with enough n-butanol to make 1,000 ml. of a stock solution containing one mol titanium in the form of a pre-condensate of butyl titanate corresponding to the water:titanium ratio of 1.25 to 1 in the original mixture.

20 ml. aliquots of the stock solution were further mixed with water and lactic acid to cause further hydrolysis of the polymeric esters present. The solutions formed had the following ratios of water and lactic acid to titanium:

TABLE 5

| Solution No. | Ratio H₂O/Ti [1] | Ratio lactic acid to Ti |
| --- | --- | --- |
| 31 | 2.5 | .58 |
| 32 | 3.0 | .58 |
| 33 | 3.5 | 1.2 |
| 34 | 4.0 | 1.2 |

[1] The figures indicated include 1.25 mols water reacted with the ester during the preliminary condensation step.

Samples of the solutions Nos. 31 to 34 were stored at room temperature. They remained clear for two weeks, and were then discarded. The bulk of each solution was heated on a boiling water bath for ten hours. Solutions Nos. 31 to 34 remained perfectly transparent.

Example 8

Five grams thiourea and 100 grams di-isopropyl-di-n-butyl titanate were dissolved in 100 ml. n-butanol. Another solution was prepared from 150 ml. n-butanol, 5 grams lead acetate trihydrate, and 10.8 grams water. The two solutions were mixed with vigorous agitation and gentle heating in a water bath until a clear solution was formed within a few minutes. The molar ratio of water originally present in the mixture to the titanate was 2.0:1, the ratio of titanium to lead was 24:1.

115 grams of the clear mixture were diluted with 285 g. of a diluent consisting of 10% butanol, 10% toluene, and 80% isopropanol. The coating solution obtained had an ash content of 2%. Glass plates were dipped in this solution, air-dried, and cured at 400° C. in a procedure otherwise as described in Example 2. After curing, the glass had a lustrous, brownish-black semi-transparent mirror surface. The thickness increase due to the deposition of the optical screen consisting of titanium dioxide having lead sulfide colloidally dispersed therein was too small to be measured with a micrometer.

When the coating solution was diluted to an ash content of 0.5%, and glass was treated in the manner described above, the coated glass was smoke colored. Objects viewed through the glass appeared practically in their natural color. Prescription sun glasses are prepared by this method from colorless stock lenses in a very simple manner.

Similar optical screens were produced from solutions containing equivalent amounts of antimony trichloride instead of lead acetate. The antimony sulfide coatings obtained were grey to black. Other heavy metals whose sulfides are darkly colored and not overly volatile may be substituted for lead or antimony, such as silver, copper, nickel, or cobalt.

Uniform coatings of heavy metal sulfide were obtained without thiourea by exposing the wet coatings to an atmosphere of hydrogen sulfide under carefully controlled conditions. Minor variations in coating thickness are reflected in lack of uniformity in the light absorbing qualities of the sulfide layers.

Dried, but uncured coatings of hydrolyzed alkyl titanates containing heavy metal salts are insoluble in water, and do not lose their heavy metal content by soaking in water. It is therefore also possible to provide titanium oxide coatings stained with heavy metal sulfides by immersing an air-dried coating of the invention in aqueous solutions of hydrogen sulfide or ammonium sulfide. In whichever manner the coatings are produced, they consist essentially of a colloidal dispersion of heavy metal sulfide in a titanium dioxide matrix.

Example 9

Coating solutions were prepared from the butyl titanate precondensate stock solution of Example 7, water, lower alkanols, lactic acid, and various compounds of metals having a valence of two or more. These compounds were dissolved or dispersed in methanol in the presence of a portion of the lactic acid and water, and the solutions or dispersion obtained were combined with solutions of the precondensate in the remainder of the solvents and the lactic acid.

Glass plates were dipped in the resulting coating solutions, air-dried, and cured at 500° C. as described hereinabove. The compositions of the coating solutions are listed in the following tables. Each solution contained 10 millimols of the butyl titanate precondensate, 23 grams n-butanol, 14 grams methanol, 14 grams isopropanol. All coating solutions were clear, except as noted. The amounts of water include those introduced with the alcohols, the lactic acid, and as water of crystallization. The amounts of lactic acid indicated are based on the anhydrous acid. The following abbreviations are being used in the table:

Barium hydroxide octahydrate _____ Ba(OH)$_2$
Basic chromium chloride _____ CrCl$_3$
Cobalt acetate tetrahydrate _____ Co ac.
Zinc acetate octahydrate _____ Zn ac.
Ammonium molybdate _____ Amm. mol.
Lead acetate trihydrate _____ Pb. ac.
Manganese chloride tetrahydrate _____ MnCl$_2$
Ferric chloride hexahydrate _____ FeCl$_3$

TABLE 6

| Solution No. | Lactic Acid, millimols | Water, millimols | Metal compound, millimols |
|---|---|---|---|
| 35 | 57 | 146 | Ba(OH)$_2$, 7.4 |
| 36 | 84 | 172 | CrCl$_3$, 11 |
| 37 | 108 | 197 | Co ac., 11 |
| 38 | 81 | 134 | Zn ac., 14 |
| 39 | 135 | 154 | Amm. mol, 10 |
| 40 | 84 | 134 | Pb. ac., 8.5 |
| 41 | 27 | 58 | ZrCl$_4$, 10 |
| 42 | 25 | 22 | MgO, 12.5 |
| 43 | 27 | 58 | SbCl$_3$, 7.1 |
| 44 | 27 | 121 | MnCl$_2$, 16 |
| 45 | 27 | 136 | FeCl$_3$, 13 |

Glossy coatings having high reflectance were produced from all solutions except No. 42. The coatings from solutions Nos. 35, 38, and 41 were clear and colorless or nearly colorless.

The coating from solution No. 36 was yellow, but clear and lustrous. Solution No. 37 yielded a coating which was brownish black. Solution No. 39 produced a coating which was slightly bluish and showed a very small amount of needle-like crystalline inclusions in a glossy and transparent matrix. Solution No. 40 contained a small amount of undissolved lead acetate. The coating produced on glass was silvery and speckled with spots that showed interference colors.

Magnesium oxide formed a finely dispsersed phase in solution No. 42, and imparted a mat or dull appearance to the coating which was smooth and almost opaque. The coating adhered well to the glass substrate. Magnesium oxide, when admixed to solutions containing coloring agents, such as Nos. 36, 37, removed the luster of the coatings obtained without interfering with the color. The coating from solution No. 43 was bluish, that from No. 44 pinkish, and that from No. 45 was reddish brown.

A multitude of decorative coatings and of coatings having useful reflectance and absorption properties for light can readily be compounded by analogy with the solutions listed above.

Example 10

A precondensate was prepared by reacting 16.2 grams (0.9 mol) water with a solution of 284 grams (1.0 mol) tetraisopropyl titanate in isopropanol. The mixture was refluxed for one hour, and sufficient isopropanol was distilled off to reduce the material volatile below 100° C. in the residue to 20 percent. 45 grams of this residue were diluted with 15 g. isopropanol and the solution obtained was gradually stirred into a mixture of 30 g. concentrated nitric acid and 50 grams water with external cooling. When all the titanate had been added, an additional amount of 30 grams water was admixed. The product obtained was a clear, somewhat amber solution containing 10% ash (TiO$_2$).

After dilution, the solution was employed for coating glass by dipping, and also by brushing. After air-drying, the coatings produced were cured at 500° C. and yielded clear adherent films showing interference colors and essentially consisting of titanium dioxide. Except for their greater thickness, the cured coatings were undistinguishable from those produced with lactic acid as a solution stabilizer.

The solution originally prepared could be diluted with isopropanol and water to an ultimate ash content of 2% and to a molar ratio of water to titanium of 30:1 without precipitating insoluble hydrolyzation products. The HNO$_3$:Ti ratio in a stable solution containing such a large excess of water was 2:1.

The coating solutions of the invention prepared with nitric acid are stable at room temperature approximately in the same manner as those containing lactic acid, but they tend to gel much more rapidly at elevated temperatures. The may be combined with inorganic coloring agents to produce modified coatings in a manner evident from the preceding examples.

Example 11

Pieces of a commercial cotton chintz glazed by means of a conventional urea-formaldehyde resin were dipped in solution No. 11 (Example1), passed between rollers to remove an excess of the coating solution, air-dried at ambient temperature, and finally cured at 100° C. for ten minutes. The gloss of the fabric finish was substantially increased by this treatment. The fabric was slightly stiffer, and more springy.

When exposed to ultraviolet light in a color fastness test, the titanate coated chintz showed distinctly better resistance to fading. The temperature rise, as measured by thermometers close to the backside of the samples was distinctly lower for the titanate coated samples indicating that the TiO$_2$ coating reflected a substantial part of the heat in the ultraviolet light. Fabrics coated in this way screen out ultraviolet rays and reflect a large part of the visible solar spectrum making them suitable for curtains, drapes, dresses and the like for summer use. A qualitative test for water repellency was performed with samples of the chintz that had only received the urea-formaldehyde resin treatment, and others that had additionally been coated with the titanate solution of the invention. The samples were sprayed with water from a nozzle under a uniform gravity head while supported on an obliquely inclined surface. Water ran off more readily from the titanate coated samples, and the first dark spots indicative of water penetration to the fibrous fabric base appeared on the titanate glazed samples only after the conventionally treated samples were fully penetrated by water.

Example 12

A commercial green pigment powder essentially consisting of chromium sesquioxide was coated with titanium dioxide by mixing 10 grams of the pigment with 7.5 grams of the concentrated titanate solution (10% TiO$_2$) produced by the method of Example 10. The slurry was mulled until it was homogeneous, spread on the bottom of a flat glass tray, and air dried. It was then further dried to constant weight in an oven at 70° C., and ultimately cured at 500° C. for 30 minutes. Agglomerations formed during the drying and curing process were broken up.

The coated pigment obtained showed a weight increase of about 7%, and was much more lustrous than the original pigment. The improved light reflecting characteristics of the titanate coated pigment were still apparent when green nitrocellulose and urea-formaldehyde lacquers and enamels were formulated with the uncoated and coated materials.

Corresponding results were obtained when the pigment material was coated with a mixture of solution No. 11 and an equal amount of n-butanol in an analogous manner. The coated pigment increased in weight by 2.3%. The improvement in light reflecting properties was substantial, but not as great as that produced with the more concentrated solution.

Example 13

A solution of 28.4 grams (0.1 mol) tetraisopropyl titanate in 81.6 grams 99% isopropanol was gradually admixed to a solution of 18 grams concentrated nitric acid in 32 grams water while the mixture was being agitated vigorously and cooled externally with cold water. The viscosity of the mixture increased sharply during mixing, but a clear, fluid liquid was obtained after a few minutes. It contained 5% titanium dioxide-equivalent in the form of a hydrolyzation product of the tetraisopropyl titanate with 20 mol-equivalents water in the presence of two mol-equivalents nitric acid. Transparent highly reflective coatings on glass could be produced from the solution in the manner described above. The solution remained fully transparent until it was discarded after several days. It will be referred to hereinafter as solution No. 46.

When one milliliter 85% phosphoric acid was admixed to 20 milliliters of solution No. 46, the mixture gelled almost instantaneously. Useful coatings could not be obtained from the gel. When four milliliters of a 1:1 mixture of 85% phosphoric acid and concentrated nitric acid were added to 20 milliliters of the solution, no visible change occurred in the properties of the resultant solution which will be referred to hereinafter as solution No. 47.

Steel grommets were cleaned in an alkaline detergent solution, pickled in hot dilute sulfuric acid, rinsed in water and alcohol, and air dried. They were then divided into several batches which were subjected to the following treatments:

Batch A: Brush coated with a commercial black lacquer having a nitrocellulose base.
Batch B: Dipped in 0.8% phosphoric acid solution for three minutes at 50° C., rinsed in water, dried, and brush coated with the black lacquer.
Batch C: Phosphated, rinsed, and dried as Batch B, then coated with solution No. 41, dried, and cured as described in Example 2 and ultimately coated with the lacquer.
Batch D: Directly coated with solution No. 47, air dried, and cured at 500° C., then brush coated with the black lacquer.
Batch E: Directly coated with solution No. 47, air dried, then coated with solution No. 11, air dried, and cured at 500° C.

The five batches of coated grommets were subjected to salt-spray tests in a conventional salt-spray chamber, and to atmospheric corrosion tests in an industrial atmosphere. Those having received only a lacquer coating failed (rusted) first in both tests. Phosphating prior to lacquering was more effective in the atmospheric corrosion test than in the accelerated salt spray test in retarding rusting. The three titanate coated batches were far superior to Batches A and B in both tests. A slight superiority of Batch D over Batch C was apparent in the salt spray test, and the atmospheric corrosion tests showed a more significant superiority for the phosphorus-containing coating of Batch D.

Batch E was at least as good as Batch D in both corrosion tests. As compared to all lacquer coated grommets, those of Batch E had superior scratch resistance. They were entirely unaffected by temperatures up to the softening temperature of the steel and by electromagnetic radiation of any wavelength from infrared to ultraviolet, as is inherent in titanium dioxide. Grommets of Batch E additionally provided with one or more layers of titanium dioxide from one of solutions Nos. 11–17 in addition had the high reflectance and color which are characteristic of heavier coatings produced from those solutions.

Example 14

A stock solution was prepared from 28.4 grams tetraisopropyl titanate, 42.6 grams 99% isopropanol, 19.2 grams water, and 10.8 grams concentrated nitric acid in the same manner as in Example 13. The water added amounted to 14 mols per mol of titanate. Aliquots of the stock solution were respectively mixed with concentrated aqueous solutions of barium nitrate, lead nitrate, zinc nitrate, and chromium trioxide in amounts to make the mol ratio between titanium and the added metal compound in the solution between 13:10 and 7:10. The solutions obtained were clear. They were diluted for use to a $TiO_2$ equivalent of 2%.

Glass plates coated with the several solutions, dried, and cured showed the same appearance as corresponding plates described in Example 9. Addition of chromium trioxide produced a coating the appearance of which was equal to that obtained from trivalent chromium.

Example 15

12.5 grams of the stock solution obtained in Example 14 were mixed with a solution of 0.58 g. zinc oxide in 1.70 g. concentrated nitric acid and 3.80 grams water and with a solution of 0.63 gram chromium trioxide in 7.37 g. water. 0.5 milliliter water was added to the mixture obtained.

The solution was cast on flat glass plates and permitted to evaporate at ambient conditions until almost dry. It was then oven-dried for 10 minutes at 100° C. and cured at 440° C. for 10 minutes. The cured coating was less than one micron thick and readily shaved off from the glass substrate in shiny black flakes.

The flakes were reduced to particles of 50–250 square micron areas and incorporated in an otherwise conventional nitrocellulose lacquer in a concentration of 5% of the lacquer solids. The lacquer obtained produced a pearlescent coating on beads dipped therein and air dried.

Similar results were obtained by using the flakes produced by curing air dry titanate coatings as described in Example 3.

Many modifications and variations of the invention will readily suggest themselves to those skilled in the art on the basis of these examples in view of the relatively free choice of process variables available.

It will be appreciated that the titanium concentration of the coating solutions of the invention may be altered to suit specific requirements. Coating solutions containing between two and three percent of $TiO_2$-equivalent readily give smooth continuous coatings fully adherent to glass after curing at the temperatures necessary for complete or almost complete removal of organic radicals and water. Higher titanium concentrations in the coating solution require more care, but smooth, transparent, and continuous coatings may be deposited in a single coat.

The pre-condensed titanate solutions of the invention may be applied to the substrates by any method known to the coating art. Dipping most readily yields precisely reproducible results, and has been preferred in the examples for this reason. The solutions are capable of being sprayed from conventional air-operated guns. The cooling of the spray by evaporation of solvent causes condensation of moisture on the droplets of the spray. Because of the tolerance of the solutions for water, such condensation of moisture does not normally affect the performance of the coating solutions. Brush roller coating and flow coating are other suitable application methods where adherent coatings are to be produced. Pigments may be made by depositing the coating solution on substrates on which adhesion is poor, or by applying coatings heavy enough that they will craze during curing. Casting wheels and band driers have been successfully employed in pigment production.

The necessary drying and curing temperature and the drying and curing periods under conditions not specifically described herein will be selected by analogy with the examples given. The temperatures required for driving off the various solvents that may be employed in my method are well known, and the thermal decomposition of organic titanates to titanium dioxide is familiar to workers in this field. The desired results are readily observed and guidance may be derived therefrom.

The manner in which coatings of different thickness may be produced from the solutions of the invention will be evident from this disclosure. For colorless coatings on glass and similar objects, the thickness should be less than one-quarter of the wavelength of the applied light, as is well known. Moderately heavier coatings show interference colors. The color and refractive index of the coatings may be modified by incorporating in the coating solutions soluble salts of such metals as aluminum, bismuth, cobalt, gold, iron, lead, manganese, platinum, silver, tin, tungsten, zinc, zirconium and the like. The lactates and nitrates of these metals are generally capable of being incorporated in the coating solutions without any other change in formulation but many other salts may be employed, as has been shown.

It will be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A method of preparing an organo-soluble titanate complex which comprises reacting a tetraalkyl titanate having from one to eight carbon atoms in each alkyl radical thereof with at least about 1.5 mol of water per mol of said alkyl titanate in the presence of an acid selected from the group consisting of lactic acid and nitric acid, when said acid is lactic acid the amount of said lactic acid being from about 0.2 to about 0.75 mol thereof per mol of said tetraalkyl titanate and the amount of said water being not more than about 4 mol per mol of alkyl titanate, and when said acid is nitric acid the amount of said nitric acid being between about 0.5 mol and about 15 mols thereof per mol of said tetraalkyl titanate and the amount of water being not substantially more than about 30 mols thereof per mol of said alkyl titanate, while said tetraalkyl titanate, said water, said acid, and the reaction product thereof are dissolved in a lower alkanol solvent medium.

2. A method according to claim 1, wherein said tetraalkyl titanate has from one to four carbon atoms in each alkyl radical thereof.

3. A method according to claim 1, wherein said tetraalkyl titanate is di-iso-propyl-dibutyl titanate.

4. A method according to claim 1, wherein the number of the carbon atoms in two of said alkyl radicals of said tetraalkyl titanate is greater than the number of carbon atoms in the other two alkyl radicals thereof.

5. A method according to claim 1, wherein said lower alkanol has up to six carbon atoms in the alkyl chain.

6. A method according to claim 5, wherein said lower alkanol has from three to four carbon atoms in the alkyl chain.

7. A method according to claim 5, wherein said lower alkanol is selected from the group consisting of isopropanol and butanol.

8. A method according to claim 1, wherein when said acid is lactic acid, the amount of water is not over 3 mols per mol of tetraalkyl titanate.

9. A method according to claim 1, wherein said tetraalkyl titanate is reacted with said water in the presence of a water soluble ionizable metal compound having at least a valence of two.

10. A method according to claim 9, wherein said ionizable compound is selected from the group consisting of compounds of aluminum, antimony, barium, bismuth, chromium, cobalt, iron, lead, manganese, molybdenum, platinum, tin, tungsten, zirconium and zinc.

11. A method according to claim 10, wherein said ionizable compound is a salt selected from the group consisting of lactates and nitrates.

12. A method according to claim 1, wherein said tetraalkyl titanate is reacted with said water in the presence of solid particles of magnesium oxide.

13. A homogeneous solution of an organo soluble titanate complex including the product of a reaction between a tetraalkyl titanate having from one to eight carbon atoms in each alkyl radical thereof and at least about 1.5 mol of water per mol of said alkyl titanate; an acid selected from the group consisting of lactic acid and nitric acid, when said acid is lactic acid the amount of said lactic acid being from about 0.2 to about 0.75 mol thereof per mol of said tetraalkyl titanate and the amount of said water being not more than about 4 mols per mol alkyl titanate, and when said acid is nitric acid the amount of said nitric acid being between about 0.5 and about 15 mols thereof per mol of said tetraalkyl titanate and the amount of said water being not substantially more than about 30 mols thereof per mol of said alkyl titanate; while said tetraalkyl titanate, said water, said acid, and the reaction product thereof are dissolved in a lower alkanol solvent medium.

14. A solution according to claim 13, wherein said tetraalkyl titanate has from one to four carbon atoms in each alkyl radical thereof.

15. A solution according to claim 10, wherein said lower alkanol solvent is selected from the group of isopropanol butanol.

16. A solution according to claim 10 wherein when said acid is lactic acid, the amount of water is not over 3 mols per mol of tetraalkyl titanate.

17. A method of coating an article with a transparent layer of titanium bearing material which comprises:
    (a) reacting a tetraalkyl titanate having from one to eight carbon atoms in each alkyl radical thereof with at least about 1.5 mol of water per mol of said alkyl titanate in the presence of a lower alkanol solvent and of an acid selected from the group consisting of lactic acid and nitric acid until a solution of a partly hydrolyzed alkyl titanate in said solvent is formed, said solvent being selected from the group consisting of isopropanol and butanol, and said tetraalkyl titanate, said water, said acid, and the reaction product thereof being dissolved in said solvent during the reacting: when said acid is lactic acid the amount of said lactic acid being from about 0.2 to about 0.75 mol per mol of said tetraalkyl titanate and the amount of said water being not more than about 4 mols thereof per mol of alkyl titanate, and when said acid is nitric acid the amount of said nitric acid being between about 0.5 mol and about 15 mols thereof per mol of said tetraalkyl and the amount of water being not substantially more than about 30 mols thereof per mol of alkyl titanate;
    (b) coating said article with said solution; and
    (c) evaporating said solvent.

18. A method as set forth in claim 17, wherein said article is heat resistant, the method further comprising heating said article after evaporation of said diluent until said hydrolyzed titanate is dehydrated.

19. A method as set forth in claim 18, wherein said tetraalkyl titanate is reacted with said water in the presence of a noble metal salt dissolved in said solution, and said article is heated after evaporation of said solvent until said noble metal salt is converted to the metal.

20. A method as set forth in claim 18, wherein a colored heavy metal sulfide is dispersed in the solution prior to said heating.

21. A method as set forth in claim 20, wherein said heavy metal is a member of the group consisting of lead, bismuth, antimony, silver, copper, nickel and cobalt.

22. An optical screen comprising a transparent carrier and a coating on said carrier, the coating consisting essentially of titanium dioxide and a heavy metal sulfide colloidally dispersed in said titanium dioxide.

23. An optical screen as set forth in claim 22, wherein said metal sulfide is lead sulfide.

24. A colored coating consisting essentially of a transparent continuous layer of titanium dioxide and a noble metal colloidally dispersed in said titanium dioxide.

25. A method of preparing an organo soluble titanate complex which comprises reacting a tetraalkyl titanate having from one to eight carbon atoms in each alkyl radical thereof with at least about 1.5 mols and not substantially more than 30 mols water per mol of said alkyl titanate in the presence of nitric acid, in an amount from about 0.5 mol to about 15 mols per mol of said tetraalkyl titanate while said tetraalkyl titanate, said water, said acid and the rection product thereof are dissolved in a lower alkanol solvent medium.

26. A method of coating a metal object which comprises:
  (a) reacting a tetraalkyl titanate having from one to eight carbon atoms in each alkyl radical thereof with more than 1.5 mols and not substantially more than 30 mols water per mol of said alkyl titanate in the presence of phosphoric acid and nitric acid, the amount of said nitric acid being between 0.5 and 15 mols per mol of said tetraalkyl titanate, said tetraalkyl titanate, said water, and said acids being elements of a liquid reaction medium, and the amount of said nitric acid being sufficient to prevent precipitation of a solid reaction product of said tetraalkyl titanate with said water, whereby a liquid reaction mixture is obtained;
  (b) applying a layer of said reaction mixture to the surface of said metal object; and
  (c) heating said layer until it is substantially free from water.

References Cited

UNITED STATES PATENTS

| | | | |
|---|---|---|---|
| 3,409,429 | 11/1968 | Ekman et al. | 23—202 X |
| 3,387,994 | 6/1968 | Dunton et al. | 117—221 X |
| 3,383,231 | 5/1968 | Allan | 106—308 X |
| 3,130,071 | 4/1964 | Brockett et al. | 117—124 |
| 3,017,282 | 1/1962 | Brill | 106—287 |
| 3,247,147 | 4/1966 | Jarboe | 260—429.5 X |
| 3,202,054 | 8/1964 | Mochel | 350—316 |

JULIUS FROME, Primary Examiner

T. MORRIS, Assistant Examiner

U.S. Cl. X.R.

23—202; 117—33, 124, 127, 138, 169; 260—429

PO-1050
(5/69)

UNITED STATES PATENT OFFICE
CERTIFICATE OF CORRECTION

Patent No. 3,460,956          Dated August 12, 1969

Inventor(s) Joseph Dahle

It is certified that error appears in the above-identified patent and that said Letters Patent are hereby corrected as shown below:

Column 4, line 42, "responsive" should be --respective--. Column 5, Table 2, Example 16, "1/2" omitted from patent under "First Cloudiness, hrs." Column 5, Table 3, Example 18, under "Ratio Acetone:Ti", "10.2" should be --10.1--. Column 5 line 55, "slides" should be --slides)--. Column 6, line 14, "drippings" should be --dippings--. Column 8, line 46, "sulfi should be --sulfides--. Column 8, line 55, "provide" should b --produce--. Column 8, line 70, "dispersion" should be --dispersions--. Column 9, line 43, "dispsersed" should be --dispersed--. Column 9, line 58, "(0.9) mol)" should be --(0.9 mol)--. Column 14, line 22 (Claim 15, line 1), "10" should be --13--. Column 14, line 25 (Claim 16, line 1), "10" should be --13--. Column 15, line 12 (Claim 25, line 8), "rection" should be --reaction--.

SIGNED AND
SEALED
MAY 26 1970

(SEAL)
Attest:

Edward M. Fletcher, Jr.

Attesting Officer

WILLIAM E. SCHUYLER, JR.
Commissioner of Patents